(12) United States Patent
Guim Bernat et al.

(10) Patent No.: US 12,541,475 B2
(45) Date of Patent: Feb. 3, 2026

(54) PLATFORM WITH CONFIGURABLE POOLED RESOURCES

(71) Applicant: Intel Corporation, Santa Clara, CA (US)

(72) Inventors: Francesc Guim Bernat, Barcelona (ES); Deepak S, Bangalore (IN); Kannan Babu R. Ramia, Bangalore (IN); Palaniappan Ramanathan, Bangalore (IN); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 801 days.

(21) Appl. No.: 17/561,901

(22) Filed: Dec. 24, 2021

(65) Prior Publication Data

US 2023/0205718 A1    Jun. 29, 2023

(51) Int. Cl.
G06F 13/40 (2006.01)
G06F 9/48 (2006.01)
G06F 11/34 (2006.01)
G06F 13/16 (2006.01)

(52) U.S. Cl.
CPC ........ G06F 13/4022 (2013.01); G06F 9/4881 (2013.01); G06F 11/3409 (2013.01); G06F 13/1668 (2013.01); G06F 13/4068 (2013.01); G06F 2213/0026 (2013.01)

(58) Field of Classification Search
None
See application file for complete search history.

(56) References Cited

U.S. PATENT DOCUMENTS

| | | |
|---|---|---|
| 2005/0114739 A1 | 5/2005 | Gupta et al. |
| 2008/0126881 A1 | 5/2008 | Bruckhaus |
| 2009/0018847 A1 | 1/2009 | Vanbeck et al. |
| 2010/0083145 A1 | 4/2010 | Schang et al. |
| 2010/0333089 A1 | 12/2010 | Talwar et al. |
| 2011/0231899 A1 | 9/2011 | Pulier et al. |
| 2015/0332155 A1 | 11/2015 | Mermoud et al. |
| 2017/0235622 A1 | 8/2017 | Boyapalle et al. |
| 2017/0289068 A1* | 10/2017 | Palermo .............. H04L 49/9047 |
| 2018/0302299 A1 | 10/2018 | Sun et al. |
| 2019/0079472 A1 | 3/2019 | Hou et al. |
| 2019/0146567 A1 | 5/2019 | Kosonocky et al. |
| 2019/0332157 A1 | 10/2019 | Hsu et al. |

(Continued)

OTHER PUBLICATIONS

"MPI: A Message-Passing Interface Standard", Version 3.0, Message Passing Interface Forum, Sep. 21, 2012, 852 pages.

(Continued)

Primary Examiner — Farley Abad
Assistant Examiner — Dayton Lewis-Taylor
(74) Attorney, Agent, or Firm — Compass IP Law PC

(57) ABSTRACT

Examples described herein relate to a configurable switch with dynamically configurable device connections to a processor socket, where the device connections are configured to meet service level agreement (SLA) parameters of a first service executing on the processor socket. For a second service that is to execute on the processor socket and the second service is higher priority than the first service, device connections of the switch to the processor socket are dynamically reconfigured to meet SLA parameters of the second service.

21 Claims, 5 Drawing Sheets

(56) References Cited

U.S. PATENT DOCUMENTS

| | | | |
|---|---|---|---|
| 2020/0133683 A1* | 4/2020 | Nachimuthu | G06F 11/1048 |
| 2020/0167258 A1 | 5/2020 | Chattopadhyay et al. | |
| 2020/0322287 A1 | 10/2020 | Connor et al. | |
| 2020/0326868 A1* | 10/2020 | Yang | G06F 3/0673 |
| 2020/0341794 A1* | 10/2020 | Martin | H04L 41/40 |
| 2021/0149703 A1* | 5/2021 | Patle | G06F 16/188 |

OTHER PUBLICATIONS

"RDMA Aware Networks Programming User Manual", Rev. 1.7, © Copyright 2015, Mellanox Technologies, 216 pages.

IBM Spectrum MPI, "Administering IBM Spectrum MPI" Version 10.2, © Copyright IBM Corp. 2018, 60 pages.

Mellanox Technologies, "Understanding MPI Tag Matching and Rendezvous Offloads (ConnectX-5)", Knowledge Article, https://mymellanox.force.com/mellanoxcommunity/s/article/understanding-mpi-tag-matching-and-rendezvous-offloads-connectx-5-x, Dec. 5, 2018, 2 pages.

Extended European Search Report for Patent Application No. 22209066.4, Mailed Apr. 12, 2023, 10 pages.

Machado Cristian Cleder et al: "Towards SLA Policy Refinement for QoS Management in Software-Defined Networking", 2013 IEEE 27th International Conference on Advanced Information Networking and Applications (AINA), IEEE, May 13, 2014 (May 13, 2014), pp. 397-404, 8 pages.

Berrange, Daniel, "Virt driver guest NUMA node placement & topology", https://blueprints.launchpad.net/nova/+spec/virt-driver-numa-placement, May 2014, 8 pages.

Natu, Mahesh, "Compute Express Link: UEFI and ACPI Specification Enhancement Recommendations", https://uefi.org/blog/compute-express-link-uefi-and-acpi-specification-enhancement-recommendations, Jul. 2020, 6 pages.

OpenStack, "Filter Scheduler", https://docs.openstack.org/nova/train/user/filter-scheduler.html, Jul. 2019, 9 pages.

"Collectd—The system statistics collection daemon", https://collectd. org/, downloaded from the interenet May 29, 2019, 4 pages.

"Landslide Core Network Testing", Spirent, https://www.spirent.com/products/core-network-test-5g-lte-ims-wifi-diameter-landslide#overview, © 2022 Spirent Communications, 11 pages.

Advisory Action for U.S. Appl. No. 16/775,069, Mailed Feb. 2, 2024, 3 pages.

Askari Hemmat, Reyhane, "SLA Violation Prediction: A Machine Learning Perspective", Universite de Montreal, Oct. 2016, 83 pages.

Final Office Action for U.S. Appl. No. 16/775,069, Mailed Oct. 20, 2023, 19 pages.

First Office Action for U.S. Appl. No. 16/775,069, Mailed Apr. 24, 2023, 23 pages.

Hariri, Hassan El, et al., "Affirmed Networks* virtualized Evolved Pacekt Core (vEPC) benchmarks with 2nd Generation Intel Xeon Scalable Processors", Intel Corporation White Paper, © 2019, 12 pages.

Hemmat, R.A., et al., "SLA Violation Prediction in Cloud Computing: A Machine Learning Perspective", ArXiv, abs/1611.10338, Nov. 30, 2016, 8 pages.

Moreno-Vozmediano, Rafael, et. al., "Efficient resource provisioning for elastic Cloud services based on machine learning techniques", Journal of Cloud Computing: Advances, Systems and Applications, Springer Open, Aug. 5, 2019, 18 pages.

Musa, Sahar Mohamed, "SLA Violation Detection Mechanism for Cloud Computing", International Journal of Computer Applications vol. 133—No. 6, Jan. 2016, 4 pages.

Tahhan, Maryam, "Collectd Metrics and Events", Wiki.OPNFV, https://wiki.opnfv.org/display/fastpath/Collectd+Metrics+and+Events, Jul. 9, 2018, 20 pages.

* cited by examiner

PLATFORM WITH CONFIGURABLE POOLED RESOURCES

BACKGROUND

Applications can be designed, developed, and deployed as coupled services (e.g., microservices) that interact among themselves and with an external client. A service can be defined as a logical set of pods or containers for scalability. The services can be defined as an abstraction on top of the pods or containers, which provides a single virtual Internet Protocol (IP) address and Domain Name System (DNS) name by which they can be discovered and utilized.

DETAILED DESCRIPTION

In some systems, a central processing unit (CPU) socket can be statically configured to be coupled through a device interface to a memory device, network interface controller (NIC), accelerator, storage, or other device. In a system with multiple CPU sockets, if a process executes on a CPU socket but accesses data from a memory device that is connected to a different socket, cross socket boundary traversal occurs, and a latency of data retrieval can increase as the data traverses socket boundaries through a link such as Intel® Ultra Path Interconnect.

Figure 1:
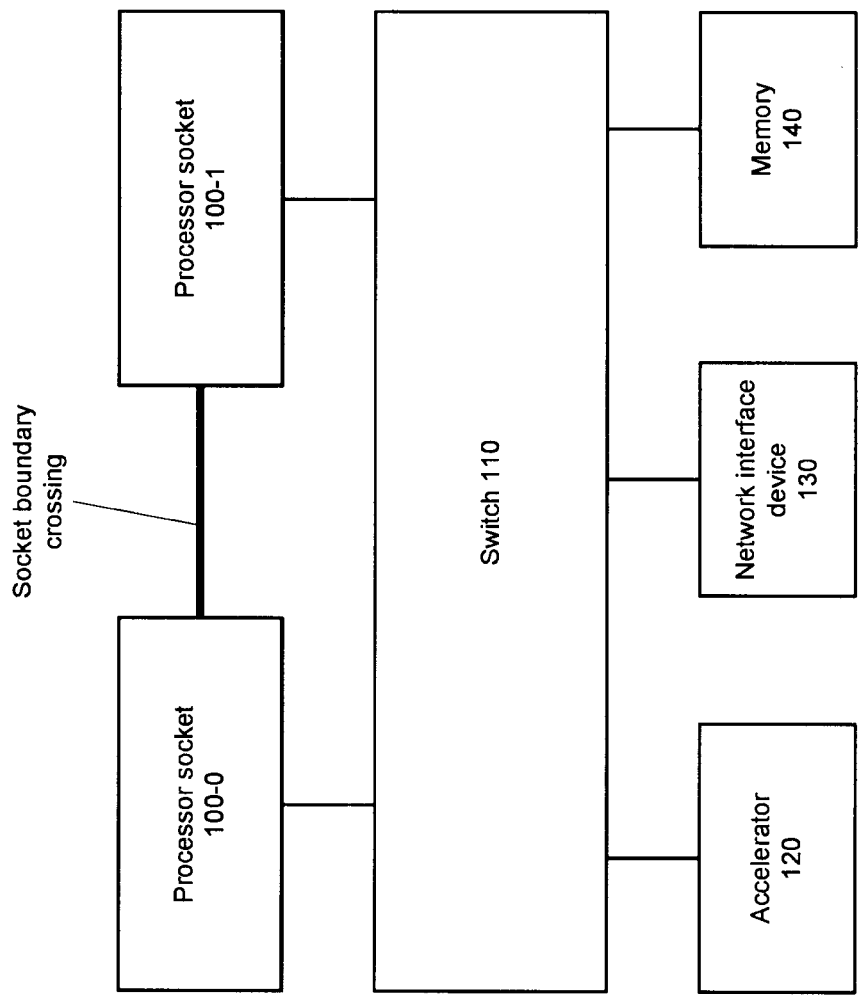
FIG. 1 depicts an example system.

FIG. 1 depicts a system that uses a switch to connect devices to processor sockets. Processor sockets 100-0 and 100-1 can include a CPU package that includes at least cores, an uncore, and cache. Compute Express Link (CXL) provides for connections between a processor socket that executes a process and device connections to be dynamically changed. See, for example, Compute Express Link (CXL) Specification revision 2.0, version 0.7 (2019), as well as earlier versions, later versions, and variations thereof. In some examples, in a manner consistent at least with CXL, switch 110 can be configured to map connections with processor sockets 100-0 and 100-1 to a device connection, including connections to one or more of: accelerator 120, network interface device 130, volatile and/or non-volatile memory 140, and other devices.

An orchestrator such as Kubernetes can deploy a pod for execution on a node with access to compute and hardware resources. A pod can include a single instance of a process in a cluster. A pod can include one or more containers, such as Docker containers. A scheduler in an orchestrator can allocate a service on a node to execute, based on the availability of resources (e.g., central processing unit (CPU) cores, memory, accelerators, and other devices) but may not consider connectivity between the host processors and devices such as accelerators and input/output (I/O) devices, which are utilized by the applications/endpoints. In some cases, the services of an application can be allocated to execute on a CPU socket that is not aligned with the interface to the accelerators or devices, utilized by the services. For communications from a CPU socket to an accelerator or other device, data traverses a socket boundary, which can increase latency of data communication and lead to performance degradation of the services.

In some examples, an orchestrator can select a node with processor socket and device(s) to execute a service based on the node being capable to meet or exceed a service level agreement (SLA) for the service. The orchestrator can cause configuration of connections between the selected processor socket and selected device(s). For example, a switch can be configured to provide connections to devices utilized by a service executing on a processor socket to avoid or reduce socket boundary traversal and provide compliance with applicable SLAs. Non-uniform memory access (NUMA)-aware services can be deployed on a processor socket with approximately uniform latency of data accesses to memory or storage connected to the processor socket. A processor socket can include one or more of: graphics processing units, CPU cores, accelerator devices, an uncore, and/or cache.

A controller can create and configure the switch so as to expose certain devices to certain platforms or nodes. Orchestrators such as Kubernetes can expand the NUMA awareness to node composition and configuration of the bandwidth and quality of service (QoS) requirements. In some cases, if a controller manager identifies that a particular service is to be scheduled in one of the NUMA nodes with a particular SLA, the controller manager can select the resources that are connected via shorter or faster connection paths to the CPU socket and configure connections to the resources.

In a compute node with resources available to execute a service, a service manager for the compute node interfaces with an orchestrator so that the orchestrator can consider socket boundaries and devices connected to a socket in selecting a node and its processor socket to execute a service. The orchestrator can discover information from a controller or service manager of connectivity options of processor sockets to hardware resources. The orchestrator can select a processor socket, hardware resource (e.g., network interface controller (NIC), accelerator, storage, memory, and so forth) that can be connected to the selected processor socket to allocate for use by a service.

The orchestrator can configure a switch controller to implement device connections by a switch (e.g., CXL or Peripheral Component Interconnect express (PCIe)) between the allocated hardware resource(s) and the processor socket based on an applicable SLA of the service. The configured a switch (e.g., CXL switch) can provide connectivity between the selected processor socket and selected hardware resources. In some cases, a service can be allocated to execute on a processor socket that involves communications that traverse a socket boundary to transfer data to the device or receive data from the device where the SLA of the service can be satisfied. An orchestrator can schedule and allocate execution of services in a processor socket in containers, virtual machines, microservices, and so forth.

Services with NUMA awareness can be provisioned on pooled resource platforms and hardware resources utilized by the service can be aligned or re-aligned with the processor socket that executes the service. Hardware interfaces or devices can be aligned with processors running performance critical applications or service endpoints in platforms with CXL switch connection. NUMA alignment can occur during service deployment or runtime based on changes to CXL platform hardware configuration. Change of connection of devices connected to a processor socket via a switch can occur.

Figure 2:
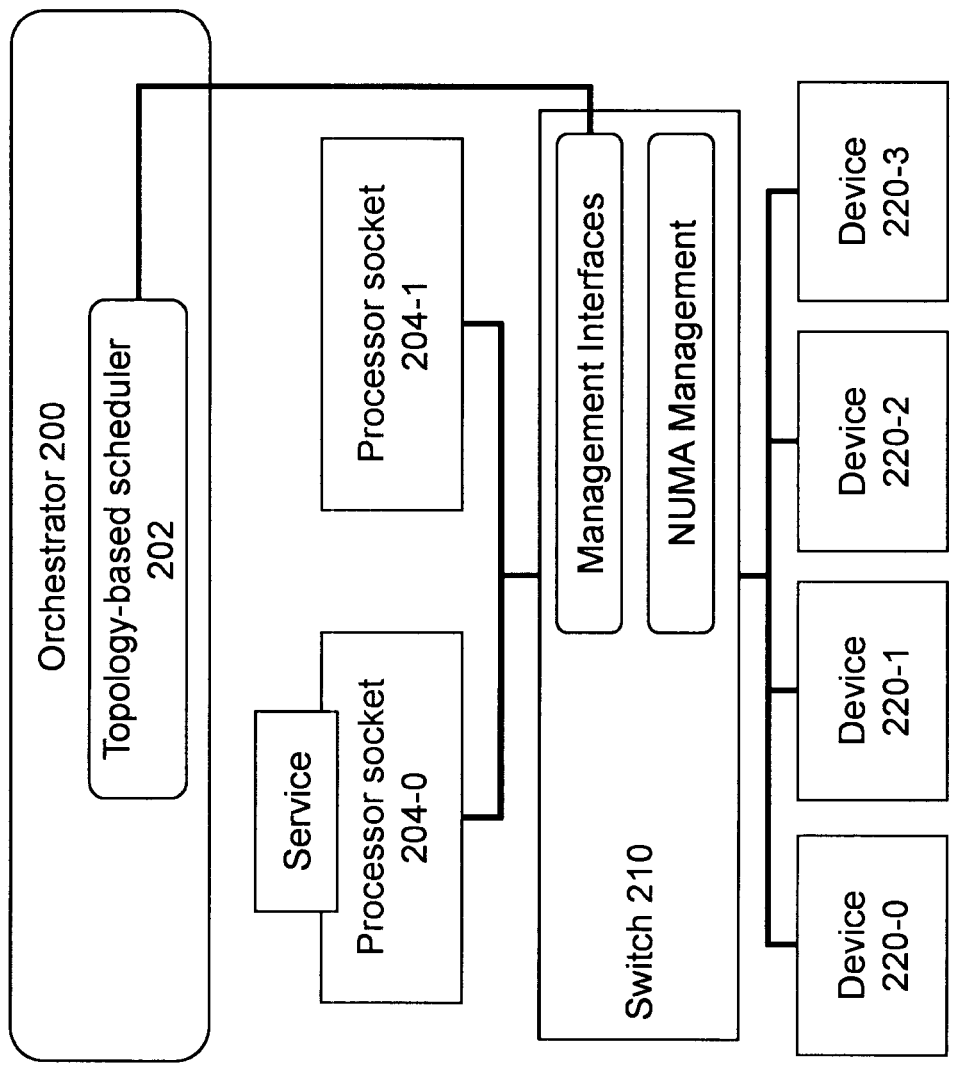
FIG. 2 depicts an example system.

FIG. 2 depicts an example system. A switch controller, described herein, can manage interfaces with topology-based scheduler 202 so that topology-based scheduler 202 can receive information concerning available processor sockets 204-0 and 204-1 and devices 220-0 to 220-3 that can be connected to processor sockets 204-0 and 204-1 by switch 210. Information can include topology of connectivity options of processor sockets 204-0 and 204-1 with devices 220-0 to 220-3.

Orchestrator 200 can manage execution of the service on a processor socket. Orchestrator 200 can utilize topology-based scheduler 202 to select a processor socket to execute a service based a configuration of processor socket connected to one or more of devices 220-0 to 220-3 meeting or exceed an SLA associated with the service. Topology-based scheduler 202 can receive topology information of devices 220-0 to 220-3 available to connect to processor socket 204-0 to 204-1. Topology-based scheduler 202 can determine a configuration of connections of devices 220-0 to 220-3 with a processor socket (e.g., processor socket 204-0) to reduce or eliminate communication between the selected processor socket and a device crossing a processor socket boundary to reduce a likelihood of utilizing a different NUMA domain or otherwise achieve applicable SLA parameters for the service (e.g., time to completion of a workload by a device). Topology-based scheduler 202 can identify a node's NUMA topology (e.g., connectivity options between processor socket and devices) and use the topology to provision or configure switch 210 to create a path between the selected processor socket and memory and the devices, based on the SLA requirements of the service. In some cases, the path can be a shortest or fastest path between the selected processor socket and memory and the devices. In some cases, the path may not be a shortest or fastest path between the selected processor socket and memory and the devices, but satisfies applicable SLA criteria.

In some examples, orchestrator 200 can be implemented using a Kubernetes scheduler or Docker swarm and access topology-based scheduler 202 as a plugin. Topology-based scheduler 202 can configure switch 210 to form connections between devices 220-0 to 220-3 utilized by the service and the processor socket (e.g., processor socket 204-0) that executes the service in accordance with the configuration. An orchestrator command (e.g., kubectl) can be used to cause deployment of the service on a platform and configure the platform to connect processor socket 204-0 that executes the service with selected one or more devices utilized by the service according to a connection configuration specified by topology-based scheduler 202.

Services can be deployed by orchestrator 200 using any of Internet Protocol (IP) Tables, IP Virtual Server (IPVS), Linux Extended Berkeley Packet Filter (eBPF), and so forth. For example, Kubernetes kube-proxy can deploy execution of the services. Components such as kube-router or Container Network Interface (CNI) can be used to deploy execution of the services.

Orchestrator 200 can load balance service deployments across NUMA sockets and connected devices to potentially improve performance of a service as well as load balance utilization of processor sockets and devices. Exclusive CPU cores and memory utilization can be requested so that application instances run on exclusive and fixed resources, such as using Linux kernel cgroups.

While examples are described with respect to CXL, another cache coherent interconnect for processors, memory expansion and hardware accelerators can be used.

Figure 3:
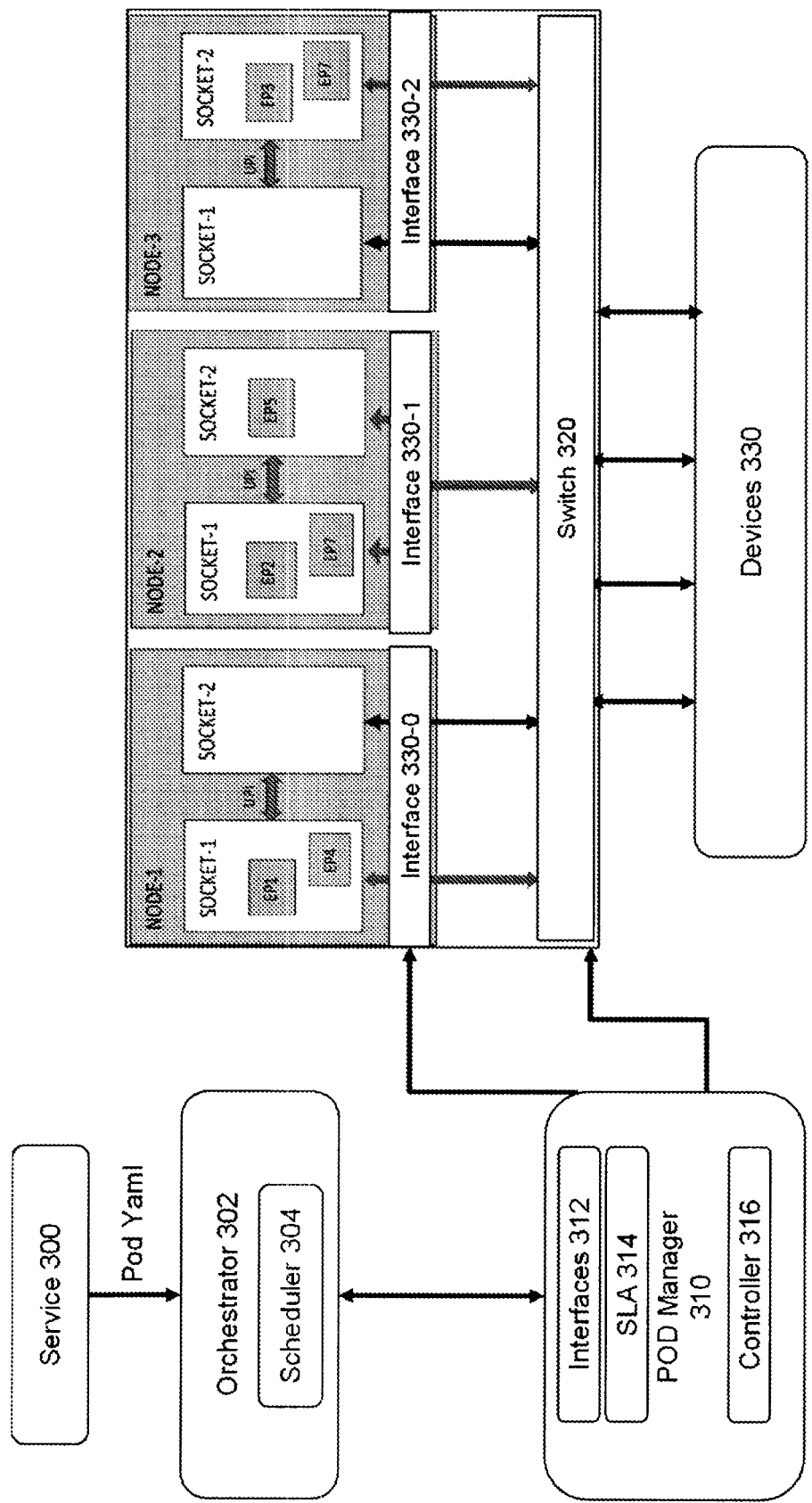
FIG. 3 depicts an example system.

FIG. 3 depicts an example system. Service 300 can be identified by a Pod YAML file and its associated hardware resource requirements and SLA requirements (e.g., CPU, memory bandwidth and rate of write and read, accelerator, network interface device transmit and receive speed, storage bandwidth and rate of write and read, and so forth). An example deployment specification can be as follows.

```
containers:
  resources:
    limits:
      cpu: 2
      memory: 4GB
      numa.processor.dev/devName: 1
```

Based on hardware resource requirements and SLA requirements of service 300, orchestrator scheduler 304 can select a node to execute a service based on capability of the node to provide hardware and/or software resources and latency and bandwidth for communications from a processor in a processor socket to devices that are available to be connected to the processor socket.

Orchestrator 302 can discover connectivity options between processor sockets and devices 330. Orchestrator 302 can communicate with switch controller 316 to perform a handshaking operation and messaging at least to perform one or more of: (a) switch controller 316 to indicate it is a controller of switch 320 for one or more nodes; (b) switch controller 316 to indicate capability to configure connections in switch 320 between one or more nodes and one or more of devices 330; (c) orchestrator 302 to provide commands and connection configurations and SLA information of a service; and/or (d) switch controller 316 to indicate successful or unsuccessful implementation of the connection configuration.

Orchestrator 302 can select a processor socket and device (s) and cause switch controller 316 to configure switch 320 to form the indicated connections between the selected processor socket and selected device(s). Controller 316 can configure switch 320 to connect selected devices of the node to a selected processor socket as specified by orchestrator 302. Switch 320 can provide device-to-device connection between one or more of NODE-1 to NODE-3 and devices 330.

Orchestrator scheduler 304 can communicate with and configure controller 316 of pod manager 310 using interfaces 312 and provide connection configurations and SLA 314 of a service. Controller 316 can configure switch controller 316 to configure switch 320 based on specifications in the YAML file. Orchestrator 302 can expand the NUMA awareness to composition of connections between a processor socket and one or more of devices 330 to achieve bandwidth and quality of service specifications for service 300. In this example, a cluster includes nodes NODE-1 to NODE-3. A node include a dual socket processors (e.g., SOCKET-1 and SOCKET-2). A socket can execute one or more endpoints (EP) as part of a service.

In some examples, an Infrastructure Processing Unit (IPU) or data processing unit (DPU), connected to CPUs and NUMA nodes, can execute orchestrator 302 and/or controller 316. In some examples, pod manager 310 can be implemented as processor-executed software, a field programmable gate array (FPGA), application specific integrated circuit (ASIC), or combination thereof. Pod manager 310 can be implemented on a same server, rack of servers, or data center as that of NODE-1 to NODE-3, switch 320, and devices 330.

Figure 4:
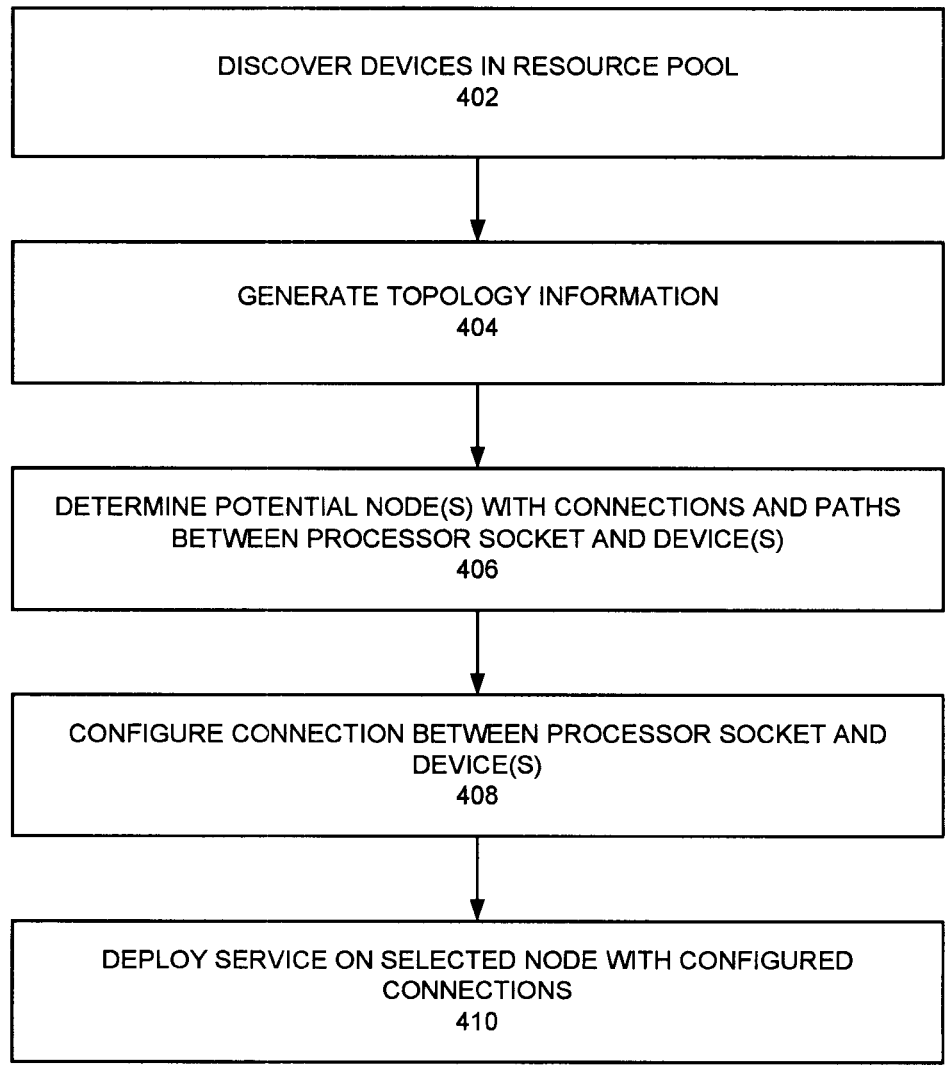
FIG. 4 depicts an example process.

FIG. 4 shows a flow diagram for configuring a switch controller. An orchestrator, scheduler, and/or switch controller can perform the process. At 402, the switch controller can discover different devices {d1 . . . dn} that are available for utilization. The switch controller can discover devices available to be connected to one or more processor sockets. The devices can be connected using a switch using protocols such as PCIe or CXL. For example, the switch controller can identify node's sockets (single socket, dual socket) and amount of memory and available devices to connect with the sockets.

At 404, the switch controller can generate topology information for devices that are available to be connected to the processor socket. For example, the switch controller can determine latency and bandwidth for communications from a processor in a processor socket to devices that are available to be connected to the processor socket. The switch controller can identify available bandwidth and latency for connection paths between processor sockets to connected devices. The switch controller can determine a topology that represents latency and bandwidth of a signal path from a processor socket to a device. The topology information can optionally be stored in memory, so that it can be retrieved by multiple control plane components of the orchestrator. A topology can be defined by one or more of: Device ID, processor ID, available latency, and/or bandwidth. A node component (e.g., daemonset), executing on a node, can monitor or check the information and update a POD manager or the switch controller with connection topology information.

At 406, an orchestrator can determine potential nodes with connections and connection paths between one or more processor sockets and one or more devices for a service to be deployed. Based on the topology information and resource and SLA requirements of a service, the orchestrator can select one or more candidate nodes, with potential processor socket to device connections, on which to execute the service. Selection of a node can be based on a deployment specification for the service. For example, a deployment specification can specify the required devices and number of devices as part of the resource requirements, along with the CPU, memory and other resources. An example of a deployment specification is a YAML file.

At 408, the switch controller can select a connection configuration between the processor socket and device(s). A service can have an associated SLA that specifies a latency or bandwidth or both from a core of a processor socket to a device. The switch controller can discover if there are any quality of service (QoS) features that can be utilized to meet or exceed the SLA associated with the service. The switch controller can configure connection(s) between the processor socket and device(s) to meet or exceed the application QoS or SLA of the service executed by the processor socket. The switch controller can be NUMA-aware by determining configurations of processor sockets with connected devices whereby a service runs on the processor socket connected to devices that communicate with the service. In some examples, switch controller can attempt to avoid connections of devices with processors that involve communications traversing a socket boundary. However, if communications are made that traverse a socket boundary and an applicable SLA can be met, then socket boundary traversal can be selected.

At 410, the service can be deployed to execute on the selected node with configured device connections. After completion of a service and the service (e.g., pod) is removed from the node, a node agent (e.g., kubelet), executing in one or more of the nodes, can deallocate one or more device connections and optionally update device status and connection status. The switch controller manager use update topology information based on updated device status and connection status.

Figure 5:
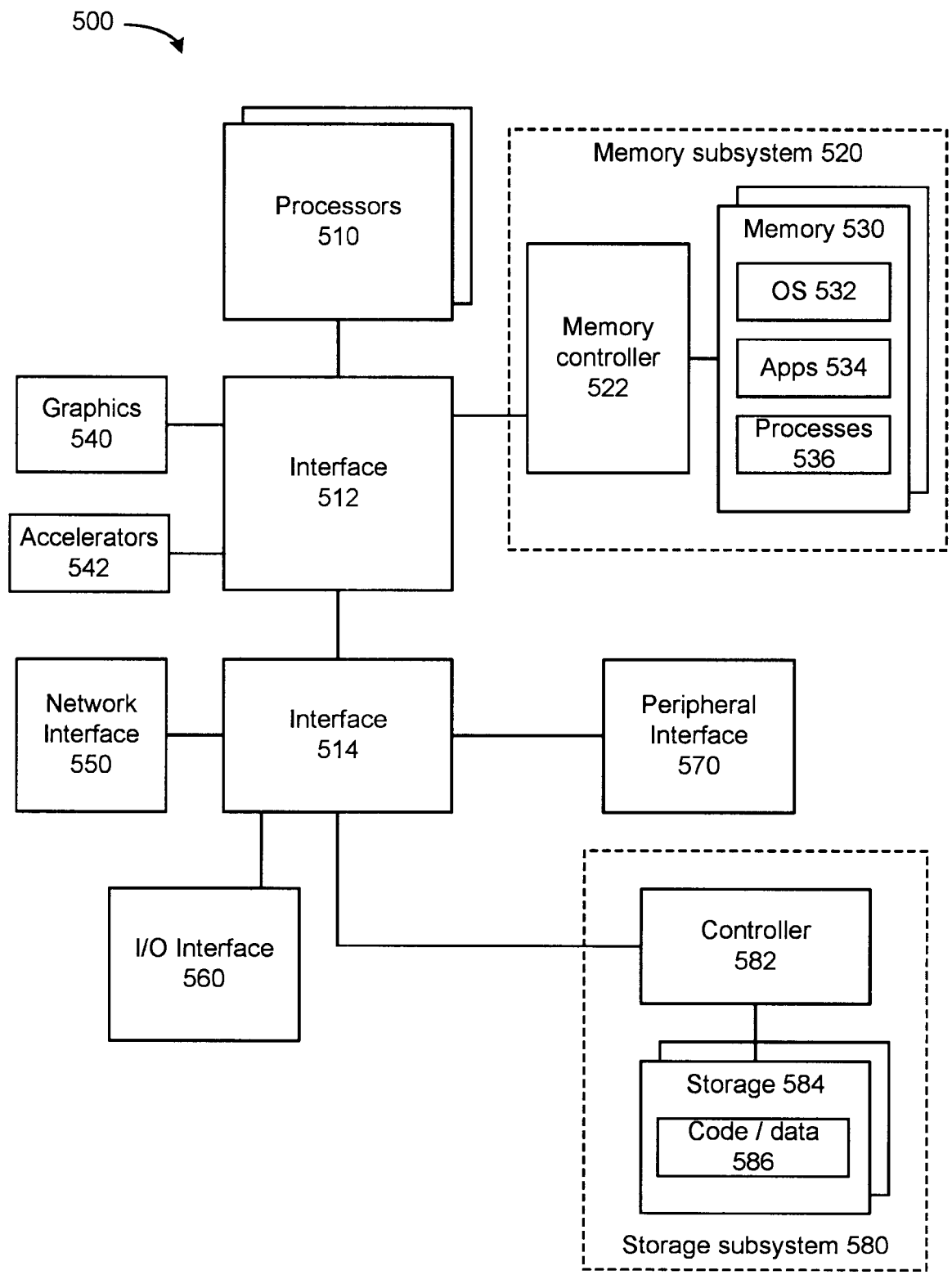
FIG. 5 depicts an example system.

FIG. 5 depicts a system. The system can use embodiments described herein to configure connections between devices and processor sockets, as described herein. System 500 includes processors 510, which provides processing, operation management, and execution of instructions for system 500. Processors 510 can include any type of microprocessor, central processing unit (CPU), graphics processing unit (GPU), XPU, processing core, or other processing hardware to provide processing for system 500, or a combination of processors. An XPU can include one or more of: a CPU, a graphics processing unit (GPU), general purpose GPU (GPGPU), and/or other processing units (e.g., accelerators or programmable or fixed function FPGAs). Processors 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. Processors 510 can include one or more processor sockets.

Examples described herein with respect to an orchestrator, scheduler, pod manager, and switch controller can be executed by an instance of processors 510, whether on a same server, same rack, same data center, or among multiple data centers.

In some examples, interface 512 and/or interface 514 can include a switch (e.g., CXL switch) that provides device interfaces between processors 510 and other devices (e.g., memory subsystem 520, graphics 540, accelerators 542, network interface 550, and so forth). Connections provide between a processor socket of processors 510 and one or more other devices can be configured by a switch controller, as described herein.

In one example, system 500 includes interface 512 coupled to processors 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a display that provides an output to a user. In one example, the display can include a touchscreen display. In one example, graphics interface 540 generates a display based on data stored in memory 530 or based on operations executed by processors 510 or both. In one example, graphics interface 540 generates a display based on data stored in memory 530 or based on operations executed by processors 510 or both.

Accelerators 542 can be a programmable or fixed function offload engine that can be accessed or used by a processors 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 542 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 520 represents the main memory of system 500 and provides storage for code to be executed by processors 510, or data values to be used in executing a routine. Memory subsystem 520 can include one or more memory devices 530 such as read-only memory (ROM), flash memory, one or more varieties of random access memory (RAM) such as DRAM, or other memory devices, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software logic to provide functions for system 500. In one example, memory subsystem 520 includes memory controller 522, which is a memory controller to generate and issue commands to memory 530. It will be understood that memory controller 522 could be a physical part of processors 510 or a physical part of interface 512. For example, memory controller 522 can be an integrated memory controller, integrated onto a circuit with processors 510.

In some examples, OS 532 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on one or more processors sold or designed by Intel®, ARM®, AMD®, Qualcomm®, IBM®, Nvidia®, Broadcom®, Texas Instruments®, among others.

Applications 534 and/or processes 536 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 500 includes interface 514, which can be coupled to interface 512. In one example, interface 514 represents an interface circuit, which can include stand-alone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a device that is in the same data center or rack or a remote device, which can include sending data stored in memory. Network interface 550 can receive data from a remote device, which can include storing received data into memory.

In some examples, network interface 550 can be implemented as a network interface controller, network interface card, a host fabric interface (HFI), or host bus adapter (HBA), and such examples can be interchangeable. Network interface 550 can be coupled to one or more servers using a bus, PCIe, CXL, or DDR. Network interface 550 may be embodied as part of a system-on-a-chip (SoC) that includes one or more processors, or included on a multichip package that also contains one or more processors.

Some examples of network device 550 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data 586 in a persistent state (e.g., the value is retained despite interruption of power to system 500). Storage 584 can be generically considered to be a "memory," although memory 530 is typically the executing or operating memory to provide instructions to processors 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processors 510 or can include circuits or logic in processors 510 and interface 514.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, or NVM devices that use chalcogenide phase change material (for example, chalcogenide glass).

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as Non-volatile Memory Express (NVMe) over Fabrics (NVMe-oF) or NVMe.

In an example, system 500 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."'

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes one or more examples, and includes a computer-readable medium comprising instructions stored thereon, that if executed, cause one or more processors to: dynamically configure device connections in a switch to a processor socket based on service level agreement (SLA) parameters of a first service executing on the processor socket.

Example 2 includes one or more examples, wherein the switch provides device interfaces between one or more devices and the processor socket.

Example 3 includes one or more examples, wherein the switch is to provide device connections in a manner consistent with Compute Express Link (CXL).

Example 4 includes one or more examples, wherein the SLA parameters comprise one or more of latency or bandwidth.

Example 5 includes one or more examples, and includes instructions stored thereon, that if executed, cause one or more processors to: determine a device to connect to the processor socket, through the switch, based on latency and/or bandwidth of communications from the processor socket to the device and SLA parameters of the first service.

Example 6 includes one or more examples, and includes instructions stored thereon, that if executed, cause one or more processors to: for a second service that is to execute on the processor socket and the second service is higher priority than the first service, dynamically reconfigure device connections of the switch to the processor socket to meet SLA parameters of the second service.

Example 7 includes one or more examples, wherein the device connections comprises connections to one or more of: a memory, a storage, a network interface controller, and/or an accelerator.

Example 8 includes one or more examples, wherein a Kubernetes consistent scheduler is to cause configuration of the device connections in the switch to the processor socket.

Example 9 includes one or more examples, and includes an apparatus comprising: a configurable switch with dynamically configurable device connections to a processor socket, wherein the device connections are configured to meet service level agreement (SLA) parameters of a first service executing on the processor socket.

Example 10 includes one or more examples, wherein the switch is to provide device interfaces between one or more devices and the processor socket.

Example 11 includes one or more examples, wherein the switch is to provide device connections in a manner consistent with Compute Express Link (CXL).

Example 12 includes one or more examples, wherein the SLA parameters comprise one or more of latency or bandwidth.

Example 13 includes one or more examples, wherein the device connections to the processor socket are selected based on latency and/or bandwidth of communications from the processor socket to devices and SLA parameters of the first service.

Example 14 includes one or more examples, wherein for a second service that is to execute on the processor socket and the second service is higher priority than the first service, device connections of the switch to the processor socket are dynamically reconfigured to meet SLA parameters of the second service.

Example 15 includes one or more examples, wherein the device connections comprises connections to one or more of: a memory, a storage, a network interface controller, and/or an accelerator.

Example 16 includes one or more examples, and includes a method comprising dynamically configuring device connections in a switch to a processor socket to meet service level agreement (SLA) parameters of a first service executing on the processor socket.

Example 17 includes one or more examples, wherein the switch provides device interfaces between one or more devices and the processor socket.

Example 18 includes one or more examples, wherein the switch is to provide device connections in a manner consistent with Compute Express Link (CXL).

Example 19 includes one or more examples, wherein the SLA parameters comprise one or more of latency or bandwidth.

Example 20 includes one or more examples, wherein the device connections comprises connections to one or more of: a memory, a storage, a network interface controller, and/or an accelerator.

Example 21 includes one or more examples, and includes a computer-readable medium comprising instructions stored thereon, that if executed, cause one or more processors to: configure a switch to receive information from an orchestrator concerning one or more non-uniform memory access (NUMA) nodes and to couple the one or more NUMA nodes with a processor executing a service based on latency.

Example 22 includes one or more examples, wherein the one or more NUMA nodes comprise memory devices.

Example 23 includes one or more examples, wherein the switch provides device interfaces between one or more devices and a socket of the processor.

What is claimed is:

1. At least one non-transitory computer-readable medium comprising instructions stored thereon, that if executed, cause one or more processors to:
based on a configuration to select a memory within a Non-Uniform Memory Access (NUMA) domain with a processor socket and service level agreement (SLA)

parameters of a first service, select a memory among multiple memory devices for access by the first service executing on the processor socket;

dynamically configure device connections in a switch between the processor socket and the selected memory among multiple memory devices; and for a second service that is to execute on the processor socket and the second service is higher priority than the first service, dynamically reconfigure device connections of the switch to the processor socket to meet SLA parameters of the second service.

2. The at least one non-transitory computer-readable medium of claim 1, wherein the switch provides device interfaces between one or more memory of the multiple memory devices and the processor socket.

3. The at least one non-transitory computer-readable medium of claim 1, wherein the switch is to provide device connections between the selected memory and the processor socket in a manner consistent with Compute Express Link (CXL).

4. The at least one non-transitory computer-readable medium of claim 1, wherein the SLA parameters comprise one or more of latency or bandwidth.

5. The at least one non-transitory computer-readable medium of claim 1, comprising instructions stored thereon, that if executed, cause one or more processors to:

determine a device to connect to the processor socket, through the switch, based on latency and/or bandwidth of communications from the processor socket to the device and the SLA parameters of the first service.

6. The at least one non-transitory computer-readable medium of claim 1, wherein the device connections comprises connections to one or more of: the memory, a storage, a network interface controller, and/or an accelerator.

7. The at least one non-transitory computer-readable medium of claim 1, wherein a Kubernetes consistent scheduler is to cause configuration of the device connections in the switch to the processor socket.

8. An apparatus comprising:
a configurable switch with dynamically configurable device connections to a processor socket, wherein:
the device connections are configured to meet service level agreement (SLA) parameters of a first service executing on the processor socket,
a device connection of the device connections is configured to connect a memory to the processor socket,
the memory and the processor are within a Non-Uniform Memory Access (NUMA) domain with the processor socket, and
for a second service that is to execute on the processor socket and the second service is higher priority than the first service, dynamically reconfigure device connections of the switch to the processor socket to meet SLA parameters of the second service.

9. The apparatus of claim 8, wherein the switch is to provide device interfaces between the memory and the processor socket.

10. The apparatus of claim 8, wherein the switch is to provide the device connection between the memory and the processor socket in a manner consistent with Compute Express Link (CXL).

11. The apparatus of claim 8, wherein the SLA parameters comprise one or more of latency or bandwidth.

12. The apparatus of claim 8, wherein the device connections to the processor socket are selected based on latency and/or bandwidth of communications from the processor socket to devices and the SLA parameters of the first service.

13. The apparatus of claim 8, wherein the device connections comprises connections to one or more of: the memory, a storage, a network interface controller, and/or an accelerator.

14. A method comprising:
based on a configuration to select a memory within a Non-Uniform Memory Access (NUMA) domain with a processor socket and service level agreement (SLA) parameters of a first service, selecting a memory among multiple memory devices for access by the first service executing on the processor socket, dynamically configuring device connections in a switch between the processor socket and the selected memory among the multiple memory devices, and for a second service that is to execute on the processor socket and the second service is higher priority than the first service, dynamically reconfiguring device connections of the switch to the processor socket to meet SLA parameters of the second service.

15. The method of claim 14, wherein the switch provides device interfaces between one or more memory of the multiple memory devices and the processor socket.

16. The method of claim 14, wherein the switch is to provide device connections between the selected memory and the processor socket in a manner consistent with Compute Express Link (CXL).

17. The method of claim 14, wherein the SLA parameters comprise one or more of latency or bandwidth.

18. The method of claim 14, wherein the device connections comprises connections to one or more of: the memory, a storage, a network interface controller, and/or an accelerator.

19. At least one non-transitory computer-readable medium comprising instructions stored thereon, that if executed, cause one or more processors to:

configure a switch to receive information from an orchestrator concerning one or more non-uniform memory access (NUMA) nodes and to couple a memory of a NUMA node of the one or more NUMA nodes with a processor executing a first service based on latency, wherein the processor and the memory of the NUMA node are within a same NUMA node and for a second service that is to execute on the processor and the second service is higher priority than the first service, dynamically reconfigure device connections of the switch to the processor to meet service level agreement (SLA) parameters for the second service.

20. The at least one non-transitory computer-readable medium of claim 19, wherein the switch provides device interfaces between one or more devices and a socket of the processor.

21. The at least one non-transitory computer-readable medium of claim 20, wherein the one or more devices comprise at least: the memory, a storage, a network interface controller, and/or an accelerator.

* * * * *